United States Patent
Schwarz et al.

(10) Patent No.: US 10,127,699 B2
(45) Date of Patent: Nov. 13, 2018

(54) SERIAL VISUAL PRESENTATION FOR WEARABLE DISPLAYS

(71) Applicant: Lenovo (Singapore) Pte. Ltd., Singapore (SG)

(72) Inventors: David Alexander Schwarz, Morrisville, NC (US); Ming Qian, Cary, NC (US); John Weldon Nicholson, Cary, NC (US); John Miles Hunt, Raleigh, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 61 days.

(21) Appl. No.: 14/633,723

(22) Filed: Feb. 27, 2015

(65) Prior Publication Data

US 2016/0253831 A1 Sep. 1, 2016

(51) Int. Cl.
*G06T 11/60* (2006.01)
*G06F 17/21* (2006.01)

(52) U.S. Cl.
CPC ............ *G06T 11/60* (2013.01); *G06F 17/214* (2013.01)

(58) Field of Classification Search
CPC .......... G06F 3/14; G06F 17/214; G06F 17/27; G06F 3/0483; G06F 3/0485; G06F 3/0488; G06F 2200/1637; G06F 3/013; G09B 17/04; G09B 17/00; G09B 5/02; G09B 5/04; G09B 5/00; G06T 11/00
See application file for complete search history.

(56) References Cited

U.S. PATENT DOCUMENTS

| | | | | |
|---|---|---|---|---|
| 6,056,551 | A * | 5/2000 | Marasco | G09B 17/04 434/178 |
| 8,947,322 | B1 | 2/2015 | Chi et al. | |
| 2009/0066722 | A1* | 3/2009 | Kriger | G06Q 30/02 345/619 |
| 2009/0289917 | A1* | 11/2009 | Saunders | G06F 3/0482 345/174 |
| 2012/0023438 | A1* | 1/2012 | Xia | G06F 3/0482 715/783 |
| 2013/0159850 | A1* | 6/2013 | Cohn | G06F 17/211 715/273 |

FOREIGN PATENT DOCUMENTS

| | | | | |
|---|---|---|---|---|
| EP | 2447818 A1 * | 5/2012 | | G06F 3/0488 |
| WO | 2012004785 A1 | 1/2012 | | |

* cited by examiner

*Primary Examiner* — Sing-Wai Wu
(74) *Attorney, Agent, or Firm* — Ference & Associates LLC

(57) ABSTRACT

One embodiment provides a method, including: receiving, at a wearable device, electronic text data; separating the electronic text data to segment the electronic text data into separate parts; and presenting, on a display screen of the wearable device, the separate parts of the electronic text data in a serial visual presentation, each part substantially occupying the display screen. Other embodiments are described and claimed.

20 Claims, 4 Drawing Sheets

SERIAL VISUAL PRESENTATION FOR WEARABLE DISPLAYS

BACKGROUND

Information handling devices ("devices"), for example cell phones, smart phones, tablet devices, laptop computers, and the like are increasingly being joined or coupled with wearable devices, such as smart watches, glasses or head mounted displays, etc. This allows users to wear an electronic device, e.g., smart watch, which provides some functionality such as a small scale display and limited interface.

By coupling the wearable device with another device such as a smart phone or tablet, e.g., via near field or other short-range wireless communication, the wearable device's limitations (e.g., reduced processing power, battery life, display size, etc.) are masked by use with a corresponding device. One area where the technical and physical limitations of the wearable device are apparent, and enhanced by use with a coupled device, is the display screen of the wearable device. Because the wearable device is often small in size, it also features a small display screen relative to other devices such as a smart phone, tablet or laptop computing device. Thus, users are often given limited display presentations, e.g., a subject line of an email, the first line or lines of an SMS text, where the user may retrieve the entire message using the coupled device, e.g., smart phone. This permits the wearable to provide a notification function.

BRIEF SUMMARY

In summary, one aspect provides a method, comprising: receiving, at a wearable device, electronic text data; separating the electronic text data to segment the electronic text data into separate parts; and presenting, on a display screen of the wearable device, the separate parts of the electronic text data in a serial visual presentation, each part substantially occupying the display screen.

Another aspect provides a wearable device, comprising: a communication element; a display screen; a processor operatively coupled to the communication element and the display screen; and a memory that stores instructions executable by the processor to: receive, at the communication, electronic text data; separate the electronic text data to segment the electronic text data into separate parts; and present, on the display screen of the wearable device, the separate parts of the electronic text data in a serial visual presentation, each part substantially occupying the display screen.

A further aspect provides a product, comprising: a storage device having code stored therewith, the code being executable by a processor of an electronic device and comprising: code that receives, at a wearable device, electronic text data; code that separates the electronic text data to segment the electronic text data into separate parts; and code that presents, on a display screen of the wearable device, the separate parts of the electronic text data in a serial visual presentation, each part substantially occupying the display screen.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
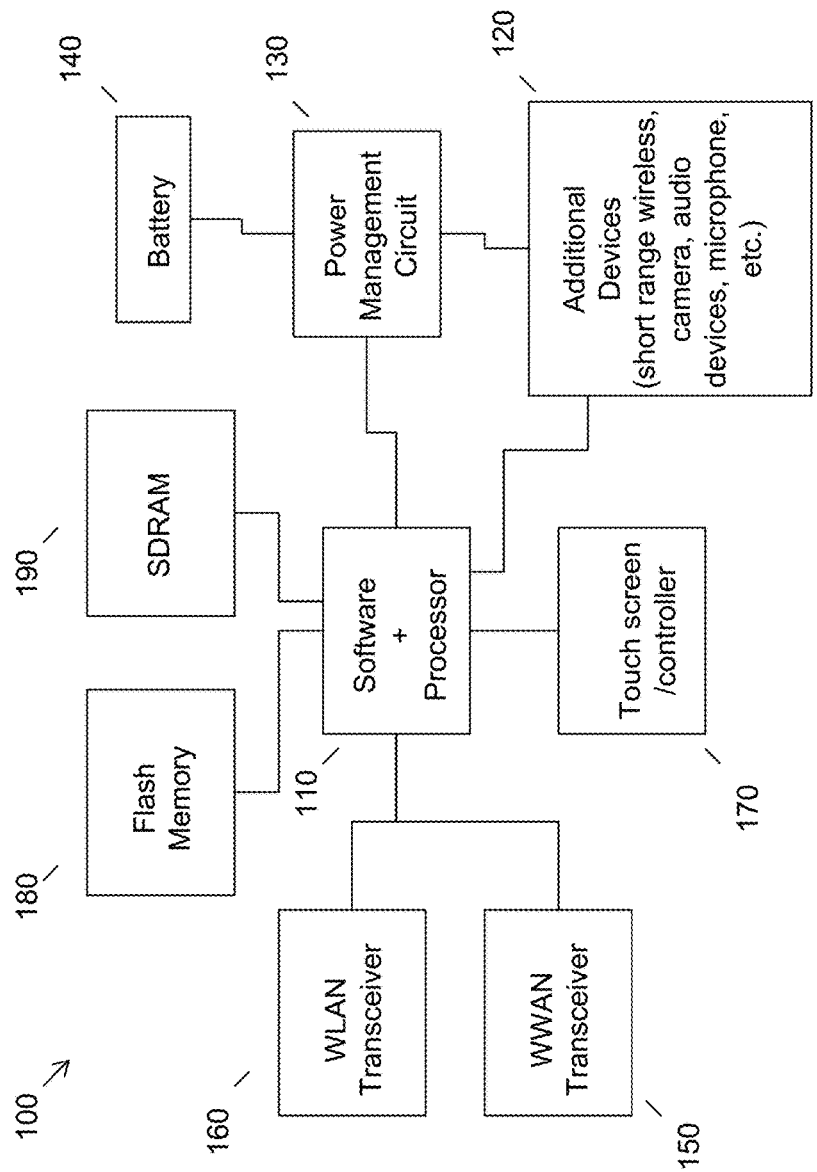
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Currently, wearable devices such as a smart watch use display screens that are too small to present a complete SMS text or other lengthy message. Instead, a conventional approach is to present the text data in parts, requiring user input (e.g., scrolling) to navigate through partial messages. The text is also usually smaller in size when compared to a text presentation of a larger device (e.g., smart phone). This results in hindrance of reading speed, comprehension and responses times for the user. Additionally, smaller text requires additional reading effort, with the potentially serious side effect of asthenopia (eye strain) for the millions of users with less than 20/20 visual acuity.

Current approaches to text data display on wearable devices thus simply attempt to make the wearable device emulate a larger device's functionality (e.g., emulate smart phone or tablet functionality), e.g., showing truncated messages in a diminutive smart watch screen with small point font. A drawback is that the wearable device is essentially rendered a less than optimal smart phone or tablet mimic, particularly regarding text data handling. This gives the user no real advantage to wearing the wearable device, save for the accessibility. Another solution is to require the use of a coupled device (e.g., smart phone) to read and respond to a text message, with the wearable device only showing a notification of the text message, giving a very marginal benefit to owning a wearable device.

Accordingly, an embodiment provides a wearable device with added display processing techniques that may be applied to text data. An embodiment employs the use of rapid serial visual presentation (RSVP) of text data such that large amounts of text data may be usably displayed, even on a small wearable display screen.

Rapid serial visual presentation has been developed as an experimental model for studying attention. Recently, RSVP has been shown to significantly increase reading speed, e.g., by as much as 33 percent. RSVP includes sequentially presenting words (or other symbols) with an inter-word presentation interval that is appropriate to the user (e.g., 250 words per minute). Through this method, a message can be displayed to the user by one or a few words per screen at a rate of progression through a sequence of words.

An embodiment employs a processing and visual presentation technique to incorporate RSVP technology with application to wearable device displays. Thus, the speed of acquisition is combined with the accessibility of the wearable device such that even large, complex text data may be usably presented to the wearer of the wearable device. This relieves the user from having to struggle through all or a portion of the text data being presented in a conventional fashion on the wearable device. An embodiment thus improves the display capability of the wearable device, allowing a user to rely only on the wearable device. That is, using this display technique, a user does not need to resort to an additional device (e.g., smart phone, tablet, etc.) to retrieve, read and respond to a complex text communication. A user now has a benefit to wearing a smart watch, as he or she can receive messages, e-mails, notifications, and other reminders significantly faster than using a phone or other device.

An embodiment furthermore provides for displaying text data using a larger text size, even given that the wearable device's display screen will be small in comparison to other devices. Screen real estate is now reserved for one or a few words at a time, allowing the timed presentation of larger, crisper text. This increased text size is easier to read and understand, possibly compounding reading speed even further, as well as reducing eyestrain or reading effort.

Moreover, an embodiment provides a more natural user interaction with text data as consumed on the wearable device. For revisiting a message, a user could employ touch or a dial on the wearable device, e.g., to scroll through the message in serial fashion. This also allows for natural edit functions to be implemented.

The same or similar serial visual presentation technique may be used for enhancing Natural Language Processing (NLP). For example, a smart watch equipped with NLP capability may be utilized to dictate responses to messages through the smart watch. After dictation, a user may revisit the message by viewing it in the same serial manner. The user may validate the dictated message, and even do editing. For example, interacting with a word in serial presentation (via touch, voice, etc.) may select it for editing, and use of the dial or other interface may permit scrolling through alternative words serially and/or allow the user to repeat the word (e.g., via voice input) for quick editing without need of a keyboard or other complex interface. The NLP system may then be updated with the corrections to enhance accuracy in the future.

The illustrated example embodiments will be best understood by reference to the figures. The following description is intended only by way of example, and simply illustrates certain example embodiments.

While various other circuits, circuitry or components may be utilized in information handling devices, with regard to wearable device, smart phone and/or tablet device circuitry 100, an example illustrated in FIG. 1 includes a system on a chip design found for example in tablet or other mobile/wearable computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additional devices 120 are commonly included, e.g., a camera, short range wireless devices, a microphone, etc. System 100 often includes a touch screen 170 for data input and display/rendering, which may include programming such as described herein for processing text data for rapid serial visual presentation, as further described herein. System 100 also typically includes various memory devices, for example flash memory 180 and SDRAM 190.

Figure 2:
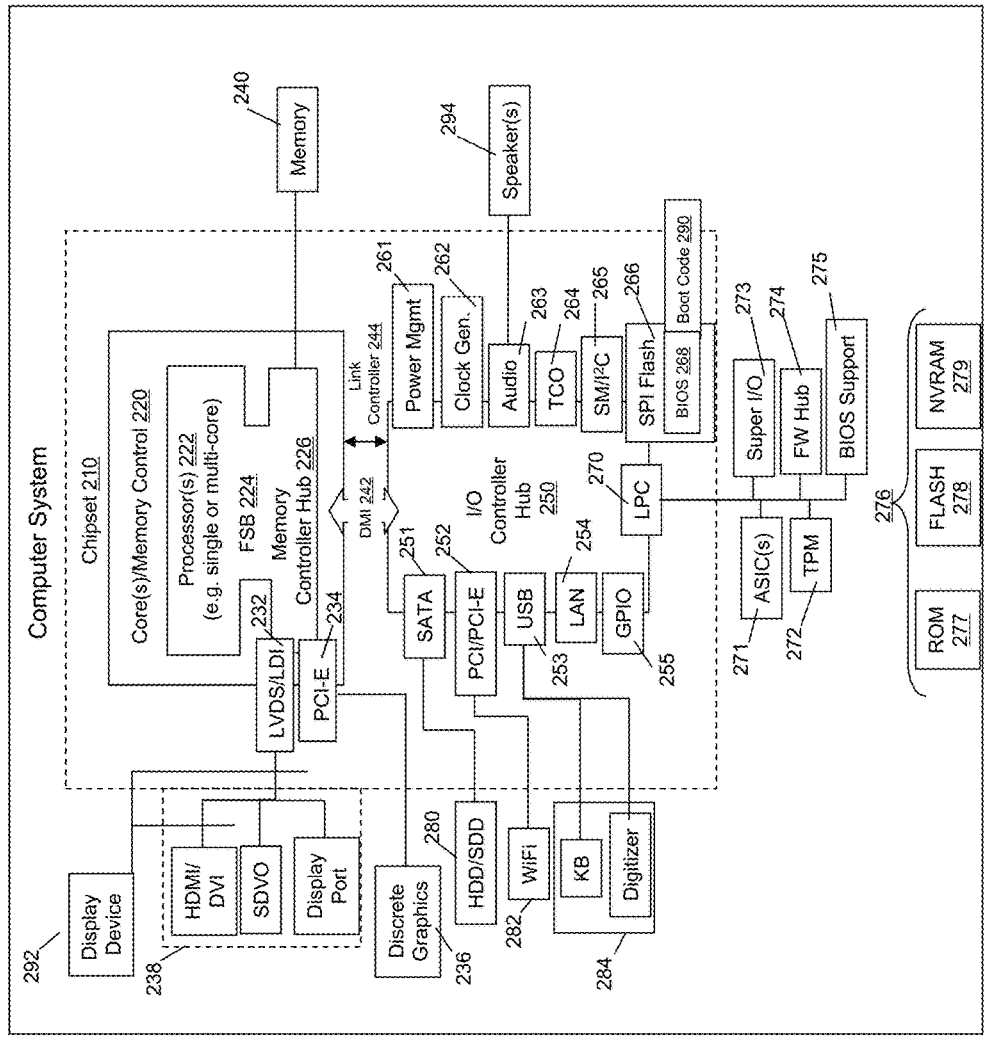
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries.

The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in electronic devices such as wearable devices (e.g., smart watch), tablets, smart phones, personal computer devices generally, and/or other electronic devices. Users may employ these electronic devices for various functions, e.g., reviewing text data of an email application, a text messaging or instant messaging application, a word processing application, etc. For example, the circuitry outlined in FIG. 1 may be implemented in a wearable device, a tablet or a smart phone embodiment, whereas the circuitry outlined in FIG. 2 may be implemented in a laptop personal computer embodiment with which a wearable device communicates, e.g., via short range wireless communication. In each case, the device may include an input and display device, e.g., a touch screen or the like, which acts to serially present text data.

Figure 3:
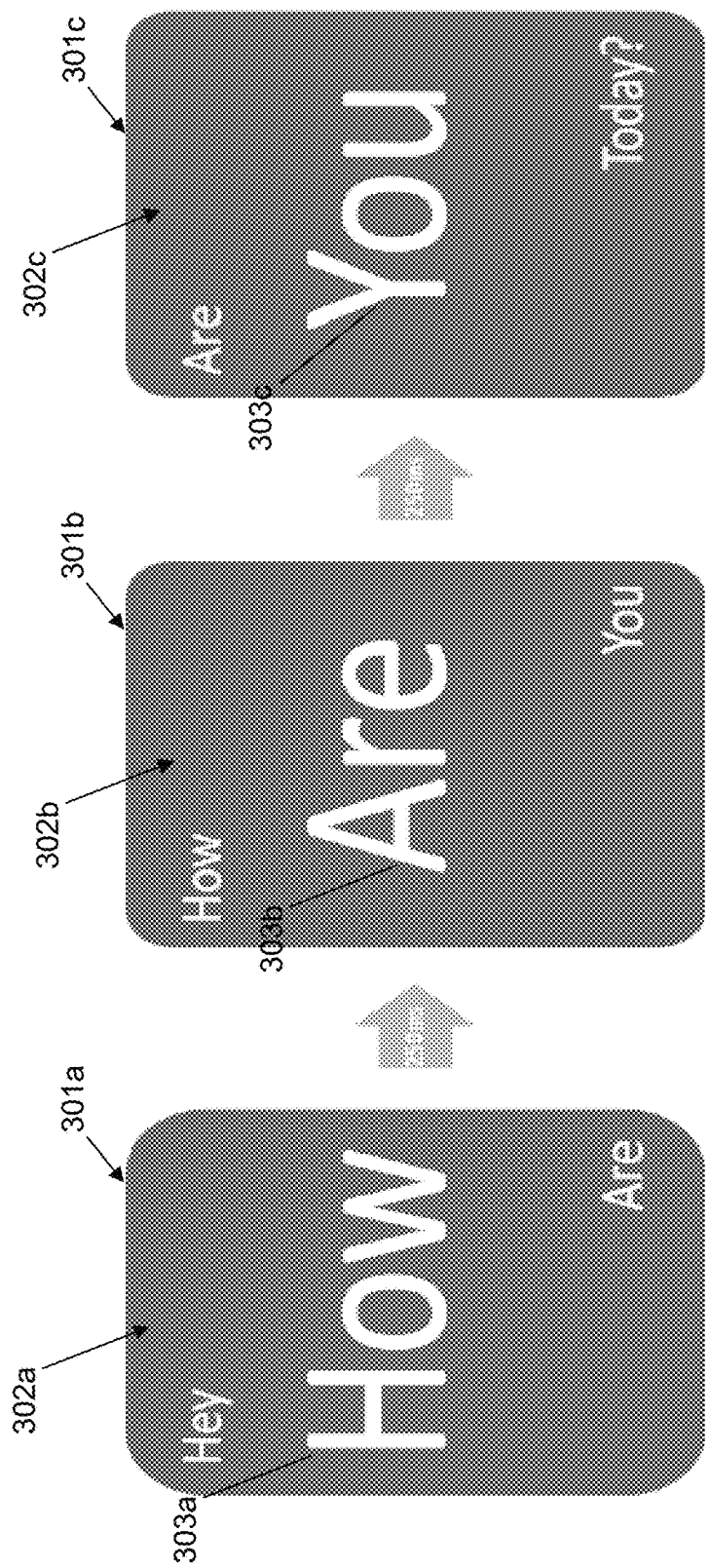
FIG. 3(A-C) illustrates an example of rapid serial visual presentation for a wearable display screen.

As illustrated in FIG. 3(A-C), an embodiment employs rapid serial visual presentation of text data (303a-303c) on a wearable device screen (301a-301c). In the example illustrated in FIG. 3(A-C), the text data "hey how are you today?" is presented in rapid serial fashion. This permits the visual presentation to include serial presentation of individual maximized words, e.g., "How" 303a, "Are" 303b, and "You" 303c. This allows separation of segments (here individual words or word groupings) in time to free up display screen space such that words may be maximized (enlarged) as compared to a normal display font inclusive or more of the text data.

Thus, in the illustrated example, display device 301a gives a visual presentation 302a including maximized or enlarged word "How" 303a, followed by use of the display device 302b to provide the visual presentation 302b of the enlarged word "Are" 303b and likewise the following use of the display device 301c to provide the visual presentation 302c of an enlarged "You" 303c. As illustrated, one or more additional words (e.g., words appearing before and/or after the maximized words in the text data sequence) may be provided, for example as reduced views in peripheral or edge portion(s) of the display 301a-301c. In this way, an embodiment segments the text data for a more intelligent, serialized display, allowing for rapid progression through the text data using enlarged views of segments of text data.

Figure 4:
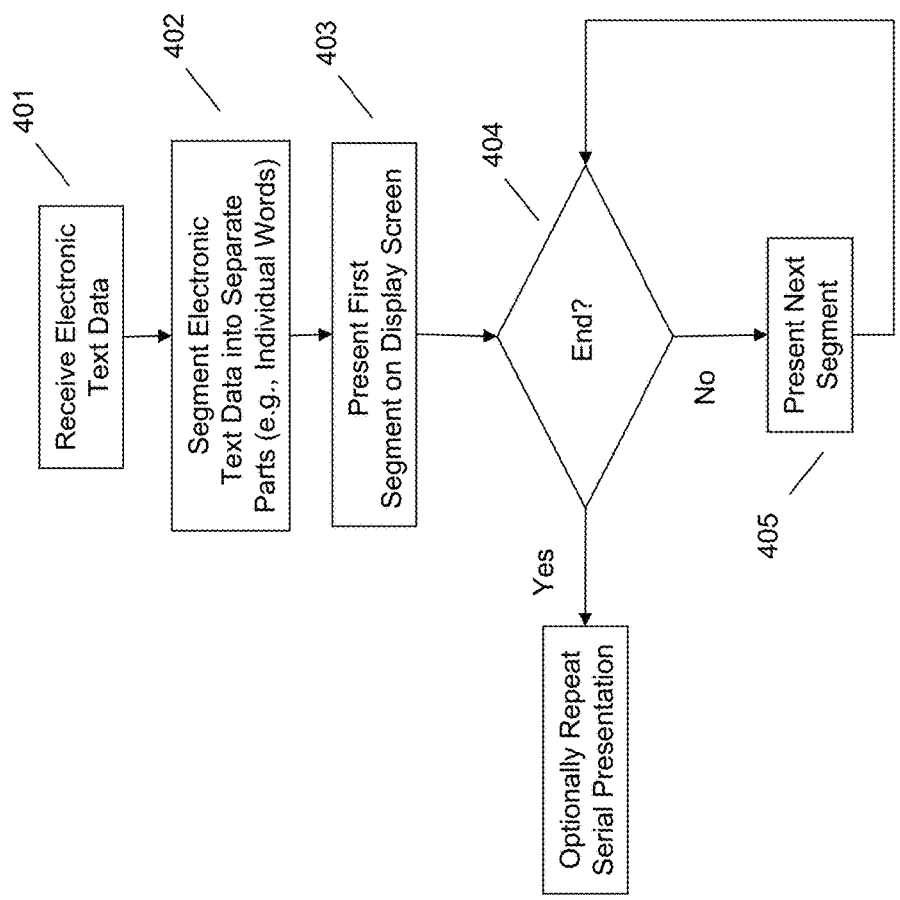
FIG. 4 illustrates an example method of providing rapid serial visual presentation for a wearable device.

In order to accomplish this, referring to FIG. 4, an embodiment employs a method including receiving, at 401, electronic text data, e.g., a text message, an email, etc. The electronic text data is separated at 402 in order to segment the electronic text data into separate parts, e.g., words or groupings of words. An embodiment then presents, at 403, the first segment of data (e.g., the word "Hey" in the text data sequence of "hey how are you doing today?") on the wearable display device. This permits the user to view an enlarged presentation of the segment of electronic text data.

As described and illustrated in the example of FIG. 3(A-C), the text data may be processed. For example, processing may include not only segmenting or grouping the electronic text data for serial display, but may additionally include formatting the electronic text data, e.g., resizing the electronic text data, changing the case of the electronic text data, changing the font of the electronic text data, changing the color of the electronic text data, changing the style of the electronic text data, etc. Such processing may be provided for adjusting the individual characters of the electronic text data or to adjust words or groups of words of the electronic text data. Additionally, changes may be made to the background used to present the electronic text data. Such processing may be done in order to render a visual presentation that permits easy comprehension of the electronic text data of the segment currently being presented.

An embodiment then progresses through the segments of electronic text data, e.g., a predetermined rate, at a variable rate, or at an adjustable rate. The example of FIG. 3(A-C) uses a rate of 250 ms, although this is a non-limiting example rate of progression. Therefore, referring again to FIG. 4, an embodiment may determine at 404 if there are remaining segments of the electronic text for presentation. If no, an embodiment may stop the rapid serial visual presentation or may optionally repeat it, as illustrated. Otherwise, i.e., if it is determined at 404 that there are remaining segments, an embodiment may progress to provide a visual presentation of the next segment of electronic text in the series at 405. This permits an embodiment to present on the display screen of the wearable device the separate parts of the electronic text data in a rapid serial visual presentation.

In an embodiment, the electronic text data is received via a wireless network communication, such as an electronic communication selected from the group consisting of an SMS text message, an email communication, and audio data. The rapid serial visual presentation may present three words per display screen, or may present fewer or more words, e.g., depending on user selection or the available display screen characteristics (e.g., size, resolution, etc.). As illustrated in FIG. 3(A-C), if three words are presented, one of the three words may occupy substantially the entire display screen, whereas the remaining two words occupy off center areas of the display screen. As shown, the rapid serial visual presentation serially presents a maximized word of the electronic text data per display screen, where the serial progression of maximized words progresses according to an ordering of the separated electronic text data.

As described herein, the same or similar rapid serial visual presentation may be repeated or provided during an editing session, e.g., for review of and confirmation/editing of electronic text data formed in response to a message. Thus, the electronic text may be derived from audio data captured by a microphone of the wearable device, such as when a user voices a response to a message. During a serial visual presentation, an embodiment may accept editing input, e.g., via touch input or voice command of the user. This permits a user to pause the serial progression such that more time may be used to present a particular segment (e.g., word or group of words). This may be accomplished during a rapid serial visual presentation of an incoming message and/or during the playback of a response message input by the user. Thus, a user may pause the serial visual presentation to provide editing inputs. The visual presentation may also include suggestions, e.g., suggested word corrections or changes, such that the user may edit in a serial fashion.

An embodiment thus provides a technical improvement to the manner in which wearable devices process and visually display or present text data. This allows for better use of limited resources, e.g., smaller available display space, such that the wearable device's functionality, e.g., for handling complex text data, is markedly or significantly improved.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions that are executed by a processor and stored on a device readable storage medium, referred to herein as a non-signal storage device. A non-signal storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a non-signal storage device is not a signal, is non-transitory, and "non-transitory" includes all media except signal media.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a special purpose information handling device or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   receiving, at a wearable device, electronic text data;
   separating the electronic text data to segment the electronic text data into separate parts;
   presenting, on a display screen of the wearable device, the separate parts of the electronic text data in a serial visual presentation without additional textual content presented between each of the separate parts;
   during the serial visual presentation, enlarging at least one displayed part with respect to other parts displayed on the display screen at the same time according to a serial progression, wherein the enlarged at least one part occupies a substantially center area of the display screen and wherein the other parts occupy off center areas of the display screen; and
   scrolling, responsive to receiving user input for interacting with the electronic text data, through the electronic text data in serial fashion, wherein the scrolling comprises transitioning an enlarged part occupying a substantially center area of the display screen to a smaller part occupying an off center area of the display screen and a smaller part occupying an off center area of the display screen to an enlarged part occupying the substantially center area of the display screen.

2. The method of claim 1, wherein the electronic text data is received via a wireless network communication.

3. The method of claim 1, wherein the electronic text data is included in a communication selected from the group consisting of an SMS text message, an email communication, and audio data.

4. The method of claim 1, wherein the serial visual presentation presents three words per display screen.

5. The method of claim 4, wherein one of the three words occupies a majority of the entire display screen.

6. The method of claim 5, wherein the remaining two words occupy off center areas of the display screen.

7. The method of claim 1, wherein the serial visual presentation serially presents a maximized word of the electronic text data per display screen.

8. The method of claim 7, wherein serial progression of maximized words progresses according to an ordering of the separated electronic text data.

9. The method of claim 1, wherein the electronic text is derived from audio data captured by a microphone of the wearable device.

10. The method of claim 1, further comprising accepting editing input during the serial visual presentation.

11. A wearable device, comprising:
a wearable housing;
a communication element;
a display screen;
a processor operatively coupled to the communication element and the display screen and housed by the wearable housing; and
a memory that stores instructions executable by the processor to:
receive, at the communication, electronic text data;
separate the electronic text data to segment the electronic text data into separate parts;
present, on the display screen of the wearable device, the separate parts of the electronic text data in a serial visual presentation without additional textual content presented between each of the separate parts;
during the serial visual presentation, enlarge at least one displayed part with respect to other parts displayed on the display screen at the same time according to a serial progression, wherein the enlarged at least one part occupies a substantially center area of the display screen and wherein the other parts occupy off center areas of the display screen; and
scroll, responsive to receiving user input for interacting with the electronic text data, through the electronic text data in serial fashion, wherein to scroll comprises transitioning an enlarged part occupying a substantially center area of the display screen to a smaller part occupying an off center area of the display screen and a smaller part occupying an off center area of the display screen to an enlarged part occupying the substantially center area of the display screen.

12. The wearable device of claim 11, wherein the communication element is a wireless network communication element.

13. The wearable device of claim 11, wherein the electronic text data is included in a communication selected from the group consisting of an SMS text message, an email communication, and a audio data.

14. The wearable device of claim 11, wherein the serial visual presentation presents three words per display screen.

15. The wearable device of claim 14, wherein one of the three words occupies a majority of the entire display screen.

16. The wearable device of claim 15, wherein the remaining two words occupy off center areas of the display screen.

17. The wearable device of claim 11, wherein the serial visual presentation serially presents a maximized word of the electronic text data per display screen.

18. The wearable device of claim 17, wherein serial progression of maximized words progresses according to an ordering of the separated electronic text data.

19. The wearable device of claim 11, wherein the communication element is a microphone and further wherein the electronic text is derived from audio data captured by the microphone.

20. A product, comprising:
a non-signal storage device having code stored therewith, the code being executable by a processor of an electronic device and comprising:
code that receives, at a wearable device, electronic text data;
code that separates the electronic text data to segment the electronic text data into separate parts;
code that presents, on a display screen of the wearable device, the separate parts of the electronic text data in a serial visual presentation without additional textual content presented between each of the separate parts;
during the serial visual presentation, code that enlarges at least one displayed part with respect to other parts displayed on the display screen at the same time according to a serial progression, wherein the enlarged at least one part occupies a substantially center area of the display screen and wherein the other parts occupy off center areas of the display screen; and
code that scrolls, responsive to receiving user input for interacting with the electronic text data, through the electronic text data in serial fashion, wherein the code that scrolls comprises code that transitions an enlarged part occupying a substantially center area of the display screen to a smaller part occupying an off center area of the display screen and a smaller part occupying an off center area of the display screen to an enlarged part occupying the substantially center area of the display screen.

* * * * *